US012595115B2

(12) United States Patent
Gonsalves

(10) Patent No.: US 12,595,115 B2
(45) Date of Patent: Apr. 7, 2026

(54) CIRCULAR SAW BLADE HOLDER

(71) Applicant: MILWAUKEE ELECTRIC TOOL CORPORATION, Brookfield, WI (US)

(72) Inventor: Flevian J. Gonsalves, New Berlin, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/413,741

(22) Filed: Jan. 16, 2024

(65) Prior Publication Data

US 2024/0239595 A1 Jul. 18, 2024

Related U.S. Application Data

(60) Provisional application No. 63/480,149, filed on Jan. 17, 2023.

(51) Int. Cl.
B65D 85/58 (2006.01)
B23D 61/02 (2006.01)

(52) U.S. Cl.
CPC ............. B65D 85/58 (2013.01); B23D 61/02 (2013.01); *B65D 2585/68* (2013.01)

(58) Field of Classification Search
CPC ........ A45C 11/26; B65D 61/02; B65D 75/32; B65D 75/326; B65D 85/02; B65D 85/58; B65D 2585/68; B23D 61/02
USPC ........................................................ 206/349
See application file for complete search history.

(56) References Cited

U.S. PATENT DOCUMENTS

| | | | |
|---|---|---|---|
| 253,886 A | 2/1882 | Over | |
| 483,991 A * | 10/1892 | Chase ................ | B65D 73/0064 |
| | | | 206/349 |
| D32,360 S | 3/1900 | Pierce | |
| 662,600 A | 11/1900 | Lenhult | |
| 1,059,420 A | 4/1913 | Worth | |
| 1,320,259 A | 10/1919 | Mårtens | |
| 1,425,725 A | 8/1922 | Trepier | |
| 1,602,217 A | 10/1926 | Wessel | |
| 1,724,394 A | 8/1929 | Chamberlain | |
| 1,740,113 A | 12/1929 | Olson | |
| 1,793,453 A | 2/1931 | Barili | |
| 1,938,399 A | 12/1933 | Olson | |
| RE19,116 E | 3/1934 | Olson | |
| 1,963,535 A | 6/1934 | Trotter | |
| 2,083,045 A | 6/1937 | Vaurs | |
| 2,158,378 A | 5/1939 | Olson | |

(Continued)

FOREIGN PATENT DOCUMENTS

| | | |
|---|---|---|
| CN | 2626885 Y | 7/2004 |
| CN | 201530551 U | 7/2010 |

(Continued)

*Primary Examiner* — Bryon P Gehman
(74) *Attorney, Agent, or Firm* — Michael Best & Friedrich LLP

(57) ABSTRACT

A saw blade holder for a circular saw blade having a central aperture. The saw blade holder includes a base and a blade mount extending from the base. The blade mount includes threads. The blade mount is configured to be received in the central aperture of the circular saw blade. The saw blade holder further includes a retaining member including threads. The retaining member is removably coupled to the blade mount for retaining the circular saw blade on the blade mount.

20 Claims, 6 Drawing Sheets

(56) References Cited

U.S. PATENT DOCUMENTS

| | | | |
|---|---|---|---|
| 2,297,261 A | 9/1942 | Thode | |
| 2,321,157 A | 6/1943 | Rees | |
| 2,321,158 A | 6/1943 | Rees | |
| 2,375,728 A | 5/1945 | Cadwallader | |
| 2,459,460 A | 1/1949 | Segal | |
| 2,568,584 A | 9/1951 | Hartman | |
| 2,573,226 A | 10/1951 | Shafer | |
| 2,601,426 A | 6/1952 | Baumann | |
| 2,675,844 A | 4/1954 | Karl | |
| 2,730,155 A | 1/1956 | Karl | |
| 2,747,166 A | 5/1956 | Hoffarth | |
| 2,770,277 A | 11/1956 | Poupitch | |
| 2,798,748 A | 7/1957 | Maurer | |
| 2,852,949 A | 9/1958 | Arthur | |
| 2,950,004 A | 8/1960 | Acomb | |
| 3,007,726 A | 11/1961 | Parkin | |
| 3,053,424 A | 9/1962 | Reinhard | |
| 3,077,218 A | 2/1963 | Ziegler | |
| 3,102,508 A | 9/1963 | Smith, Jr. | |
| 3,115,243 A | 12/1963 | Nash | |
| 3,181,584 A | 5/1965 | Borowsky | |
| 3,259,231 A | 7/1966 | Romanowski et al. | |
| 3,261,454 A | 7/1966 | Elson et al. | |
| 3,320,846 A | 5/1967 | Orain | |
| 3,329,875 A | 7/1967 | Demeritt | |
| 3,332,464 A | 7/1967 | Castel | |
| 3,352,344 A | 11/1967 | Lanius, Jr. | |
| 3,464,308 A | 9/1969 | Dohmeier | |
| 3,476,009 A | 11/1969 | Markey | |
| D217,540 S | 5/1970 | Weise | |
| D230,469 S | 2/1974 | Reynolds | |
| 3,796,124 A | 3/1974 | Crosa | |
| 3,888,289 A | 6/1975 | Reynolds | |
| 3,913,649 A | 10/1975 | Stanaitis | |
| 3,992,974 A | 11/1976 | Miki et al. | |
| 4,020,734 A | 5/1977 | Bell | |
| 4,157,725 A | 6/1979 | Stanaitis | |
| 4,205,572 A | 6/1980 | Weiner | |
| 4,390,210 A | 6/1983 | Wisniewski et al. | |
| 4,480,490 A | 11/1984 | Inoue | |
| 4,499,994 A | 2/1985 | Rentch | |
| D278,883 S | 5/1985 | Frieberg | |
| 4,588,082 A | 5/1986 | Ridings | |
| 4,589,797 A | 5/1986 | Martins | |
| 4,810,144 A | 3/1989 | Martelli | |
| 4,810,145 A | 3/1989 | Villas | |
| 4,822,959 A | 4/1989 | Schwab | |
| 4,848,571 A * | 7/1989 | Fullar | B65D 85/02 |
| | | | 206/452 |
| 4,896,771 A * | 1/1990 | Edwards | B65D 85/04 |
| | | | 206/349 |
| 5,056,975 A | 10/1991 | Ando | |
| 5,078,266 A | 1/1992 | Rackley | |
| 5,085,550 A | 2/1992 | Kendrick | |
| 5,112,178 A | 5/1992 | Overhues et al. | |
| 5,195,860 A | 3/1993 | Steyn | |
| 5,299,186 A | 3/1994 | Tsurushima | |
| 5,456,057 A | 10/1995 | Bannon et al. | |
| 5,515,968 A | 5/1996 | Taniyama | |
| 5,537,844 A | 7/1996 | Maclean | |
| 5,707,193 A | 1/1998 | Hasegawa | |
| 5,713,692 A | 2/1998 | McCarrick et al. | |
| 5,803,692 A | 9/1998 | Postadan | |
| 5,828,008 A | 10/1998 | Lockwood et al. | |
| 5,833,422 A | 11/1998 | Haga et al. | |
| 5,890,861 A | 4/1999 | Kaiser et al. | |
| 5,901,846 A | 5/1999 | Betcher | |
| 5,931,695 A | 8/1999 | Scully et al. | |
| 5,950,822 A | 9/1999 | Cloran et al. | |
| 6,016,909 A | 1/2000 | Chang | |
| 6,082,943 A | 7/2000 | Schneider | |
| 6,141,185 A | 10/2000 | Blum | |
| 6,161,689 A | 12/2000 | Reithel | |
| 6,161,693 A | 12/2000 | Findle et al. | |
| 6,164,447 A | 12/2000 | Svetlik | |

| | | | |
|---|---|---|---|
| 6,227,363 B1 | 5/2001 | Lu | |
| 6,227,785 B1 | 5/2001 | Kilgore | |
| 6,267,239 B1 | 7/2001 | Maki | |
| 6,283,280 B1 | 9/2001 | Wong et al. | |
| 6,415,918 B1 | 7/2002 | Wong et al. | |
| 6,446,797 B1 | 9/2002 | Shiga | |
| 6,470,553 B1 | 10/2002 | Retzbach | |
| 6,478,150 B1 | 11/2002 | Sølling | |
| D469,768 S | 2/2003 | Marsilio et al. | |
| 6,516,945 B2 | 2/2003 | Myszka et al. | |
| 6,626,289 B2 | 9/2003 | Nagata et al. | |
| 6,669,018 B2 | 12/2003 | Lau | |
| 6,675,963 B2 | 1/2004 | Myszka et al. | |
| 6,705,813 B2 | 3/2004 | Schwab | |
| 6,729,468 B1 | 5/2004 | Dobmeier | |
| 6,739,814 B1 | 5/2004 | Horng et al. | |
| 6,799,677 B2 | 10/2004 | Marsilio et al. | |
| 6,868,966 B2 | 3/2005 | German, III | |
| 6,874,635 B2 | 4/2005 | Curtsinger | |
| D505,565 S | 5/2005 | Chen | |
| 6,896,133 B2 | 5/2005 | Spagna | |
| 6,910,575 B2 | 6/2005 | Curtsinger et al. | |
| 6,988,348 B2 | 1/2006 | Curtsinger et al. | |
| 6,994,307 B2 | 2/2006 | Curtsinger et al. | |
| 7,066,327 B2 | 6/2006 | Baublitz et al. | |
| D528,407 S | 9/2006 | Schwab | |
| 7,128,328 B2 | 10/2006 | Torongo | |
| 7,140,489 B2 | 11/2006 | Lax et al. | |
| 7,155,880 B2 | 1/2007 | Curtsinger et al. | |
| 7,191,898 B1 | 3/2007 | Williams | |
| 7,192,232 B2 | 3/2007 | Esser | |
| 7,435,099 B2 | 10/2008 | Kirkus | |
| 7,462,007 B2 | 12/2008 | Sullivan et al. | |
| 7,472,790 B2 | 1/2009 | Martinez | |
| 7,484,448 B2 | 2/2009 | Schmid et al. | |
| 7,487,872 B2 | 2/2009 | Curtsinger et al. | |
| 7,665,603 B2 | 2/2010 | Leesberg | |
| 7,815,044 B2 | 10/2010 | Kasubowski et al. | |
| 7,942,261 B2 | 5/2011 | Heuser et al. | |
| 7,950,886 B2 | 5/2011 | Siegal | |
| 7,997,410 B2 | 8/2011 | Ali et al. | |
| 8,069,983 B2 | 12/2011 | Cross | |
| 8,069,996 B2 | 12/2011 | Wu | |
| 8,296,790 B2 | 10/2012 | Hinotani et al. | |
| D692,747 S | 11/2013 | Schwab | |
| D703,034 S | 4/2014 | Stewart | |
| 8,746,451 B2 | 6/2014 | Nicholls et al. | |
| D747,183 S | 1/2016 | Davidson et al. | |
| 9,238,300 B2 | 1/2016 | Wang | |
| 9,689,417 B2 | 6/2017 | Stewart | |
| 10,549,703 B2 | 2/2020 | Korber | |
| 10,816,027 B2 * | 10/2020 | May | F16B 33/02 |
| 11,299,322 B2 * | 4/2022 | Lee | B65D 85/02 |
| 2001/0000599 A1 | 5/2001 | Belden, Jr. | |
| 2002/0056654 A1 | 5/2002 | Carman et al. | |
| 2002/0112974 A1 | 8/2002 | Lau | |
| 2002/0189111 A1 | 12/2002 | Krondorfer et al. | |
| 2003/0029748 A1 | 2/2003 | Hargrave-Thomas | |
| 2004/0079657 A1 | 4/2004 | Yau et al. | |
| 2007/0029216 A1 | 2/2007 | Liu | |
| 2007/0157784 A1 | 7/2007 | Gass et al. | |
| 2007/0231105 A1 | 10/2007 | Parker | |
| 2010/0072093 A1 | 3/2010 | Cross | |
| 2013/0071205 A1 | 3/2013 | Kuehn | |
| 2016/0114739 A1 | 4/2016 | Korber | |
| 2017/0021986 A1 | 1/2017 | Teicher | |
| 2020/0393013 A1 | 12/2020 | Schneider | |
| 2023/0001496 A1 | 1/2023 | Meyers et al. | |

FOREIGN PATENT DOCUMENTS

| | | | |
|---|---|---|---|
| CN | 202481439 U | 10/2012 | |
| CN | 103241474 A | 8/2013 | |
| CN | 203345465 U | 12/2013 | |
| CN | 208592829 U | 3/2019 | |
| DE | 718488 C | 3/1942 | |
| DE | 235699 A1 | 5/1986 | |
| DE | 10333754 A1 | 3/2005 | |
| DE | 202008005336 U1 | 8/2008 | |

(56) References Cited

FOREIGN PATENT DOCUMENTS

| | | | | | |
|---|---|---|---|---|---|
| DE | 202008003350 | U1 | * | 7/2009 | ............ B25H 3/006 |
| EP | 559443 | A1 | | 9/1993 | |
| EP | 0636802 | A2 | | 2/1995 | |
| GB | 2316928 | A | | 3/1998 | |
| GB | 2359541 | A | | 8/2001 | |
| WO | 03084843 | A1 | | 10/2003 | |
| WO | 2012148776 | A1 | | 11/2012 | |
| WO | 2012167730 | A1 | | 12/2012 | |
| WO | WO-2021113280 | A1 | * | 6/2021 | ............ B23D 61/10 |

* cited by examiner

CIRCULAR SAW BLADE HOLDER

CROSS-REFERENCE TO RELATED APPLICATION

This application claims priority to U.S. Provisional Patent Application No. 63/480,149, filed Jan. 17, 2023, the entire contents of which are incorporated herein by reference.

FIELD OF THE INVENTION

The present invention relates to holders for displaying articles. More specifically, the present disclosure relates to holders for storing or displaying circular saw blades.

BACKGROUND

Generally, circular saw blades may be displayed on a holder within a packaging for merchandising purposes and for other various reasons. The packaging may inhibit a potential purchaser from contacting the saw blade and/or allow the saw blade to hang from a merchandise rack.

SUMMARY

In one embodiment, the invention provides a saw blade holder for a circular saw blade having a central aperture. The saw blade holder includes a base and a blade mount extending from the base. The blade mount includes threads. The blade mount is configured to be received in the central aperture of the circular saw blade. The saw blade holder further includes a retaining member including threads. The retaining member is removably coupled to the blade mount for retaining the circular saw blade on the blade mount.

In another embodiment, the invention provides a saw blade holder for a circular saw blade having a central aperture. The saw blade holder includes a base, a blade mount extending from the base, and a retaining member including a plurality of wings formed in a perimeter of the retaining member. The blade mount is configured to be received in the central aperture of the circular saw blade. The retaining member is removably coupled to the blade mount for retaining the circular saw blade on the blade mount.

In another embodiment, the invention provides a saw blade holder for a circular saw blade having a central aperture. The saw blade holder includes a base having a lip axially extending a first distance from an outer circumference of the base, a blade mount axially extending a second distance from the base, and a retaining member removably coupled to the blade mount for retaining the circular saw blade on the blade mount. The second distance is less than the first distance. The blade mount is configured to be received in the central aperture of the circular saw blade.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
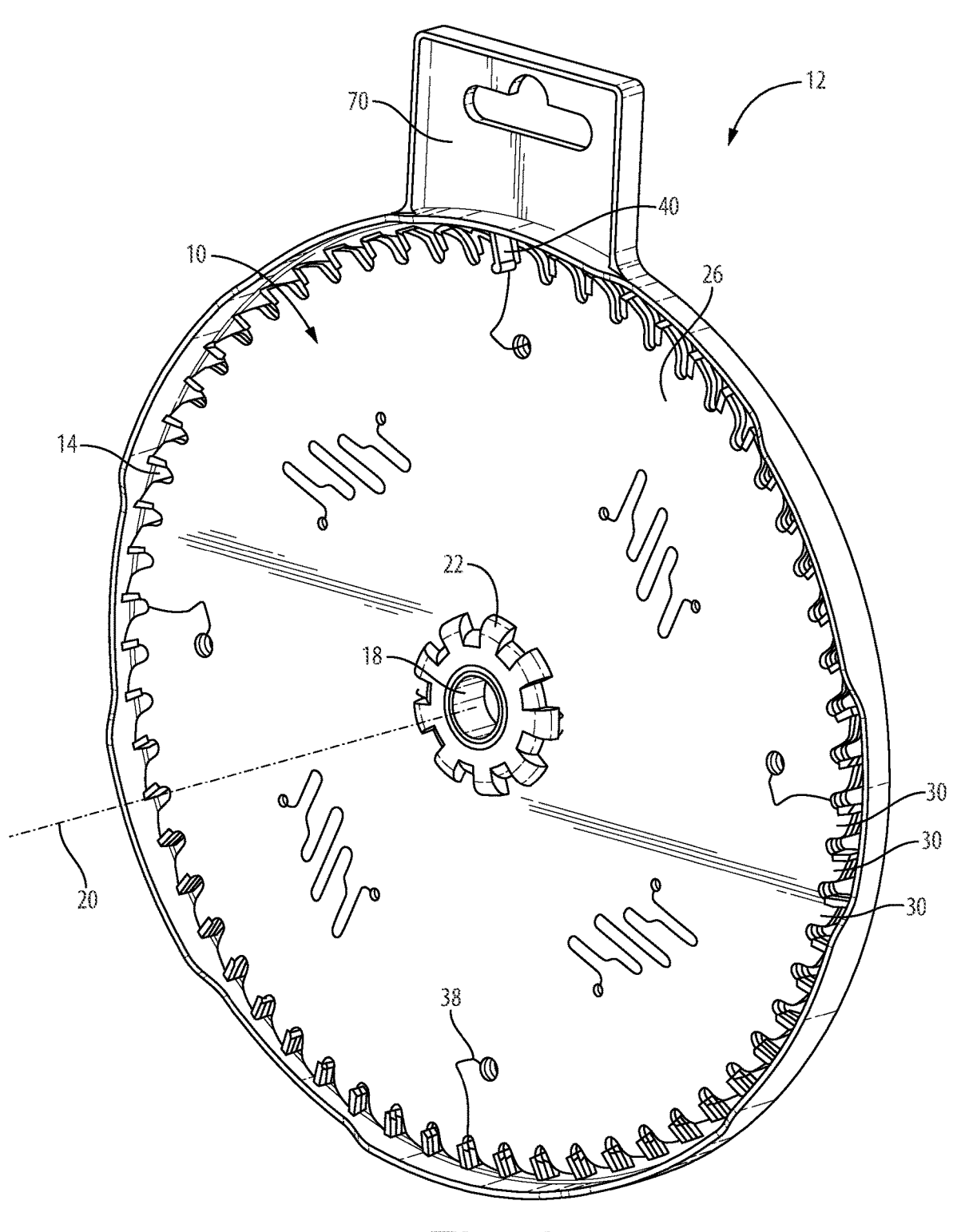
FIG. 1 is a front perspective view of a saw blade holder system including a circular saw blade and a saw blade holder.
Figure 2:
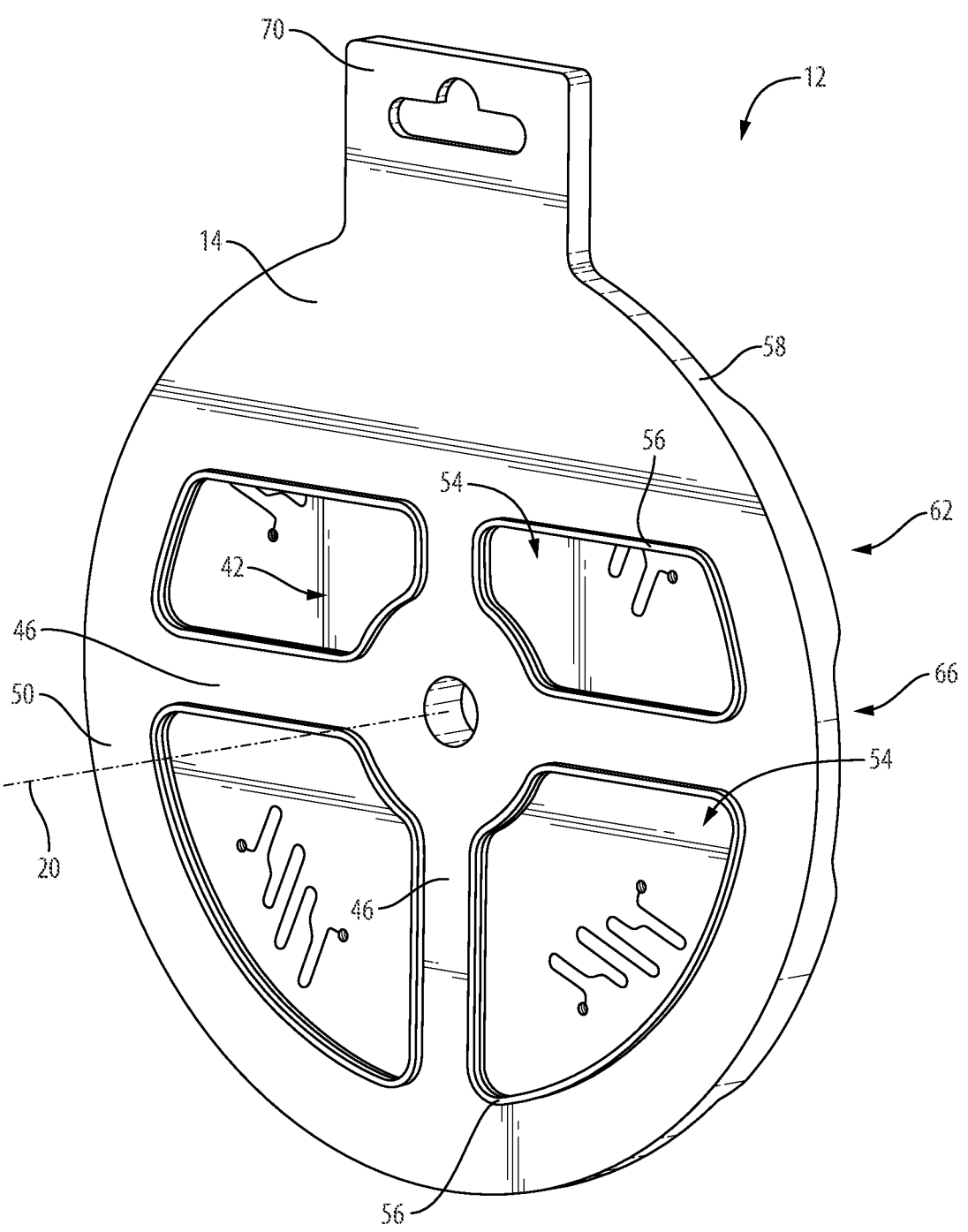
FIG. 2 is a rear perspective view of the saw blade holder system of FIG. 1.
Figure 3:
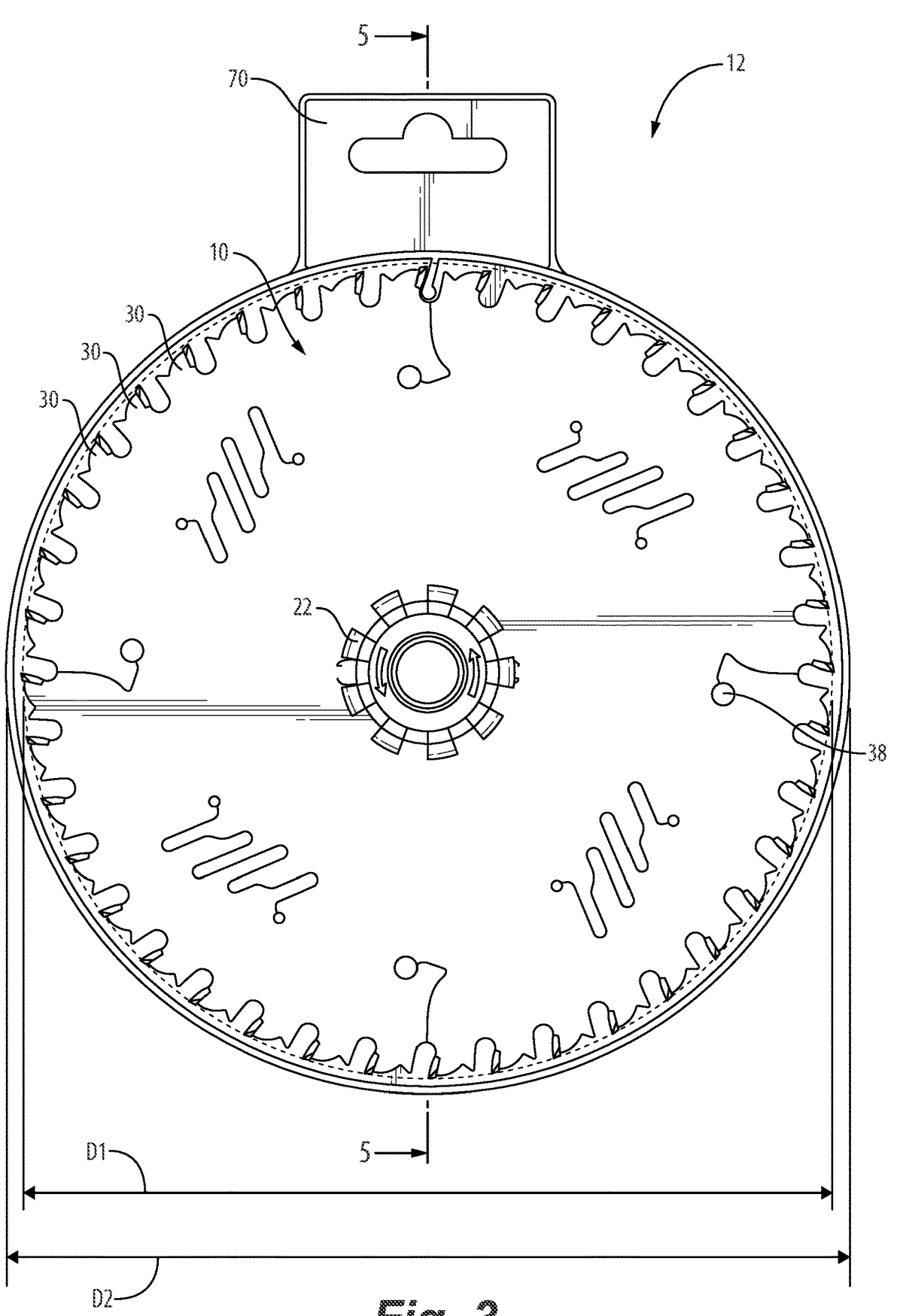
FIG. 3 is a front view of the saw blade holder system of FIG. 1.
Figure 5:
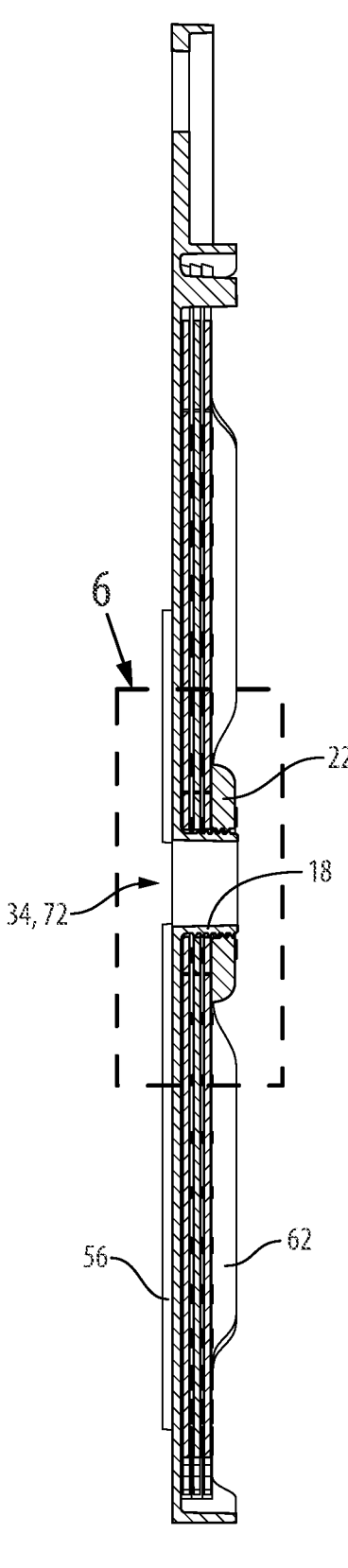
FIG. 5 is a cross-sectional view of the saw blade holder system of FIG. 1, taken along line A-A of FIG. 3.
Figure 6:
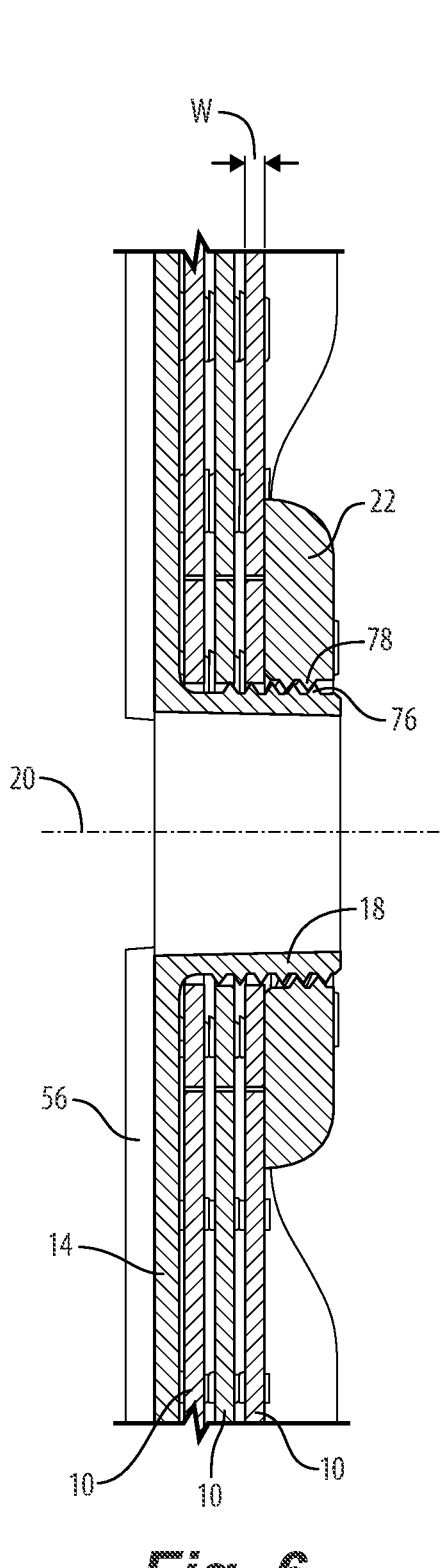
FIG. 6 is a magnified cross-sectional view of the saw blade holder system of FIG. 1, taken from the callout B of FIG. 5.

FIGS. 1-3 illustrate a circular saw blade 10 and a saw blade holder 12, which together define a saw blade holder system. The circular saw blade 10 has an outer diameter D1 and a thickness or width W (FIG. 6). The illustrated circular saw blade 10 includes a body 26, a plurality of cutting teeth 30, a central aperture 34 (FIG. 5), and at least one relief slot 38. In other embodiments, the circular saw blade 10 may have other configurations.

The blade holder 12 is configured to receive and support the circular saw blade 10. For example, the blade holder 12 may be used in a retail setting to display the circular saw blade 10 for purchase. The blade holder 12 may also be used in a workplace or home setting to store the circular saw blade 10 when not in use. The illustrated blade holder 12 includes a base 14, a blade mount 18 supported by the base 14, and a retaining member 22 removably coupled to the blade mount 18. The blade mount 18 defines a central axis 20. The central axis 20 extends perpendicular relative to the base 14. The saw blade holder 12 further includes an anti-rotation member 40, which is configured to be received between adjacent cutting teeth 30. The anti-rotation member 40 inhibits the saw blade 10 from rotating relative to the saw blade holder 12. The blade holder 12 also has a diameter D2 that is substantially similar to, but slightly larger than the diameter D1 of the saw blade 10. In other embodiments, the diameter D1 of the saw blade 10 and the diameter D2 of the blade holder 12 may have little to no similarity in size. The illustrated blade holder 12 may support a stack of three saw blades 10. In other embodiments, the blade holder 12 may support a single saw blade 10 or a stack of fewer or more than three saw blades 10.

Figure 4:
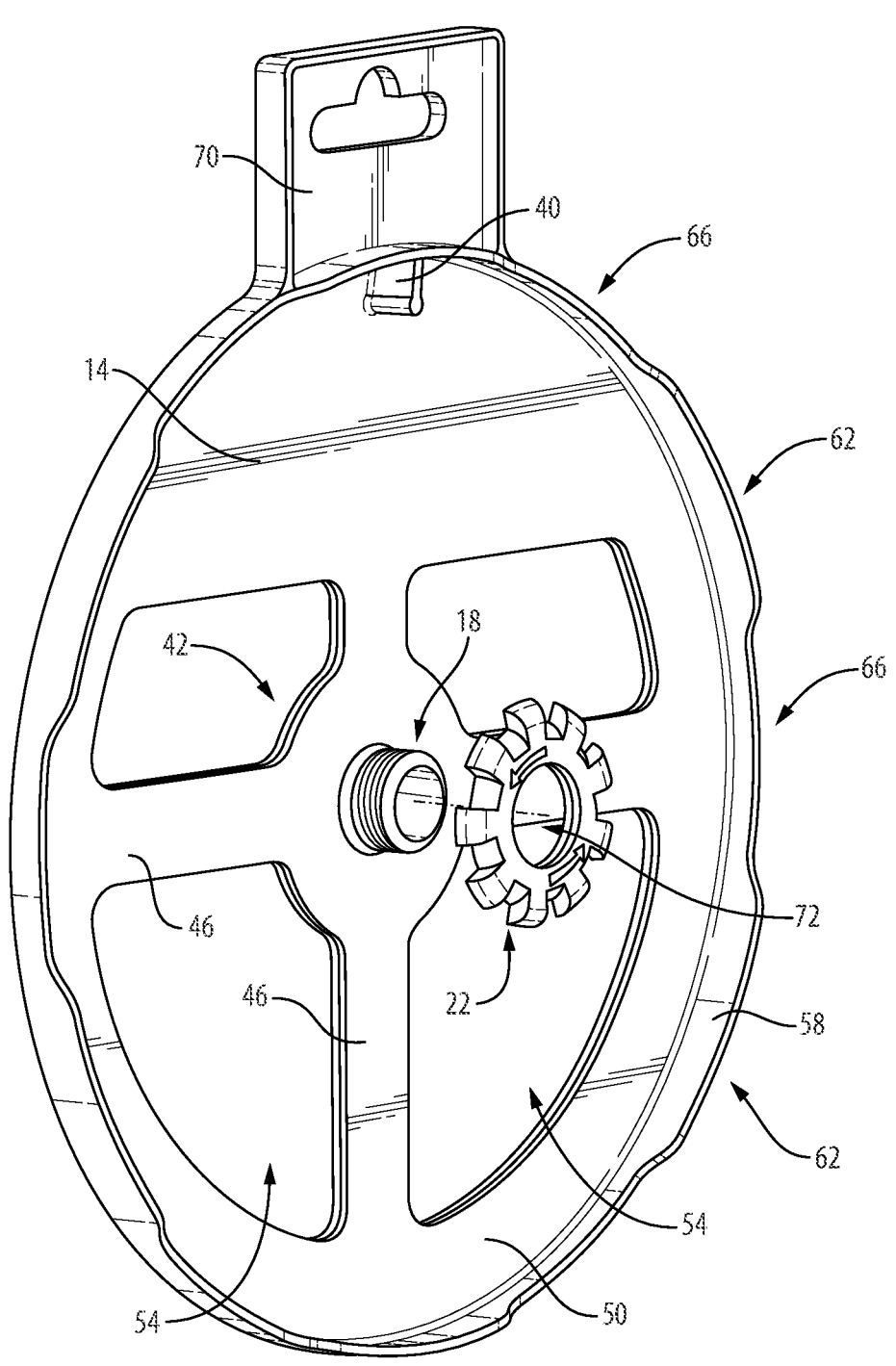
FIG. 4 is an exploded perspective view of the saw blade holder of FIG. 1.

Referring to FIGS. 2 and 4, the illustrated base 14 includes a hub 42, one or more spokes 46 extending from the hub 42, and a rim 50. The hub 42 is positioned substantially at the center of the base 14 and supports the saw blade mount 18. The spokes 46 extend radially outward from the hub 42 to the rim 50. A void 54 (also referred to as a window 54) is defined between each pair of spokes 46 to reduce the amount of material needed to support the saw blade mount 18 on the base 14. Additionally, the voids 54 may be used to assist in removal of the saw blades 10 from the blade holder 12. In the illustrated embodiment, the base 14 includes four spokes 46 that extend from the hub 42 and four corresponding voids 54. The spokes 46 are equally spaced about the base 14. In other embodiments, the base 14 may include other numbers of spokes 46 and voids 54 and/or the spokes 46 may be unevenly spaced. Alternatively, the base 14 may be a monolithic disk that does not include the voids 54. The illustrated voids 54 are bordered by void walls 56, which extend from the body 26 along the central axis 20 in a direction away from the retaining member 22. The void walls 56 are configured to add strength to the voids 54. Additionally, the illustrated void walls 56 define a rearmost portion of the saw blade holder 12 (FIG. 5). As such, when the blade holder 12 is placed on a surface (e.g., a tabletop), only the void walls 56 will contact the ground surface.

With continued reference to FIGS. 2 and 4, the rim 50 includes a lip 58 around an outer circumference of the rim 50. The lip 58 extends parallel to the central axis 20. In some embodiments, the lip 58 may extend a distance equal to at least the width W (FIG. 4) of the saw blade 10 or the width of a stack of saw blades 10. The lip 58 may help cover and radially constrain the saw blade 10 while the saw blade 10 is held on the holder 12. The illustrated lip 58 is undulating, with alternating raised portions 62 and recessed portions 66. The undulating lip 58 allows the saw blades 10 to be more easily grasped and removed from the holder 12. For example, a user will more easily fit a finger between the recessed portions 66 and the saw blades 10) than between the raised portions 62 and the saw blades 10. In some embodiments, the stack of saw blades 10 extend past the recessed portions 66.

The lip 58 also facilitates stacking the saw blade holder 12 with other, similar saw blade holders. For example, the saw blade holder 12 can be stacked on top of another saw blade holder such that a rear surface of the base 14 rests on the rim of the another saw blade holder. In addition, one or more other saw blade holders can be stacked on top of the lip 58 of the saw blade holder 12. Stacking is possible because no other features of the saw blade holder 12 (e.g., the blade mount 18, the retaining member 22, the anti-rotation member 40), etc.) or the stack of saw blades 10 extends axially further than the lip 58.

With reference to FIGS. 1-4, the base 14 further includes at least one hang tab 70) that projects radially from the rim 50. The hang tab 70 may be used to hang the holder 12. The holder 12 may be hung for a number of reasons. Such reasons may include hanging the holder 12 to display the saw blade 10 during merchandising or hanging the holder 12 to store the saw blade 10 at home or in a workshop. In the illustrated embodiment, the hang tab 70 is integrally formed with the base 14. In other embodiments, the hang tab 70 may be a separate piece that is permanently or removably coupled to the rim 50.

As illustrated in FIGS. 4 and 5, the blade mount 18 and the anti-rotation member 40 are integrally formed with the base 14 and extend away from the base 14. The anti-rotation member 40 also extends radially inward from the lip 58. The illustrated blade mount 18 and anti-rotation member 40 extend away from the base 14 along the central axis 20 in a direction opposite the direction that the void walls 56 extend from the base 14. The blade mount 18 is configured to be received in the central aperture 34 of the circular saw blade

10 and support the circular saw blade 10 on the holder 12. In other embodiments, the blade mount 18 or the anti-rotation member 40 may be separate pieces that are permanently or removably coupled to the base 14.

With continued reference to FIGS. 4-6, the blade mount 18 includes a mount thread 76 located on an outside surface of the blade mount 18. The blade mount 18 is configured to mate with a similar retaining thread 78 on the retaining member 22. In the illustrated embodiment, the mount thread 76 includes a triple start thread. Similarly, the retaining thread 78 includes a triple start thread. The threads 76, 78 having three start threads allows the retaining member 22 to be quickly secured to the blade mount 18 (i.e., relative to a single or double start thread). For example, the triple start threads 76, 78 have a lead distance (i.e., distance traveled in one rotation) three times longer than a single start thread of the same pitch. Thus, if a single start thread is rotated three times to achieve full engagement and secure the retaining member 22 in place, the triple start threads 76, 78 will only need to be rotated once. This threading arrangement saves the user time in securing the retaining member 22 to the blade mount 18. In other embodiments, the blade mount 18 may include a single start thread or different multi start thread (e.g., double, quadruple, etc.) and may be located on an inside surface of the blade mount 18.

With continued reference to FIGS. 4-6, the retaining member 22 may be received on the saw blade mount 18 to retain the saw blade 10 to the holder 12. The retaining member 22 combines the functionality of a typical nut and washer design. The illustrated retaining member 22 is a generally annular member having an overall cross-section that is larger than the central aperture 34. The illustrated retaining member 22 is also reusable and may be referred to as a reusable retaining member. In some embodiments, the retaining member 22 may be referred to as a reusable washer or a washer. The retaining member 22 has a central opening 72 that receives the blade mount 18. The illustrated central opening 72 is circular to generally match the shape and size of the blade mount 18. In the illustrated embodiment, the retaining member 22 further includes a plurality of protrusions 74 (also referred to as a plurality of wings 74) formed in a perimeter of the retaining member 22. Stated another way, the wings 74 extend radially from the central opening 72 of the retaining member 22. The wings 74 help a user engage and manipulate (e.g., rotate) the retaining member 22. For example, the wings 74 allow a user to engage and manipulate the retaining member 22 using a bare or gloved hand. In the illustrated embodiment, the retaining member 22 may be placed on the blade mount 18 after one circular saw blade 10 is coupled to the blade mount 18 or after multiple circular saw blades 10 are coupled to the blade mount 18.

The retaining member 22 may be formed of an extruded plastic. In some embodiments, the retaining member 22 may be made of an elastically flexible material that also maintains rigidity to constrain at least one saw blade 10 on the blade mount 18. In other embodiments, the retaining member 22 may be made of other suitable materials, such as metal or a composite material. As such, the retaining member 22 is also reusable. That is, the retaining member 22 may be removed from the blade mount 18 without cutting, breaking, or otherwise destroying the retaining member 22. The retaining member 22 may, therefore, be reconnected to the blade mount 18 after the circular saw blade 10 is removed and recoupled to the blade mount 18 for storage. The retaining member 22 may also be connected to another blade mount on a similar holder, if desired.

With reference to FIGS. 5 and 6, the retaining member 22 is in a secured position, such that the retaining threads 78 are fully engaged with the mount thread 76 and the retaining member 22 abuts a top blade in the stack of saw blades 10. The illustrated embodiment includes three saw blades 10. The illustrated retaining member 22 may also be in the secured position with a stack of two saw blades 10 or a single saw blade 10. This allows the user to remove the retaining member 22 from the blade mount 18, remove one saw blade 10 from the stack of saw blades 10, and resecure the retaining member 22 on the blade mount 18 with the remaining saw blade(s) 10.

Figure 7:
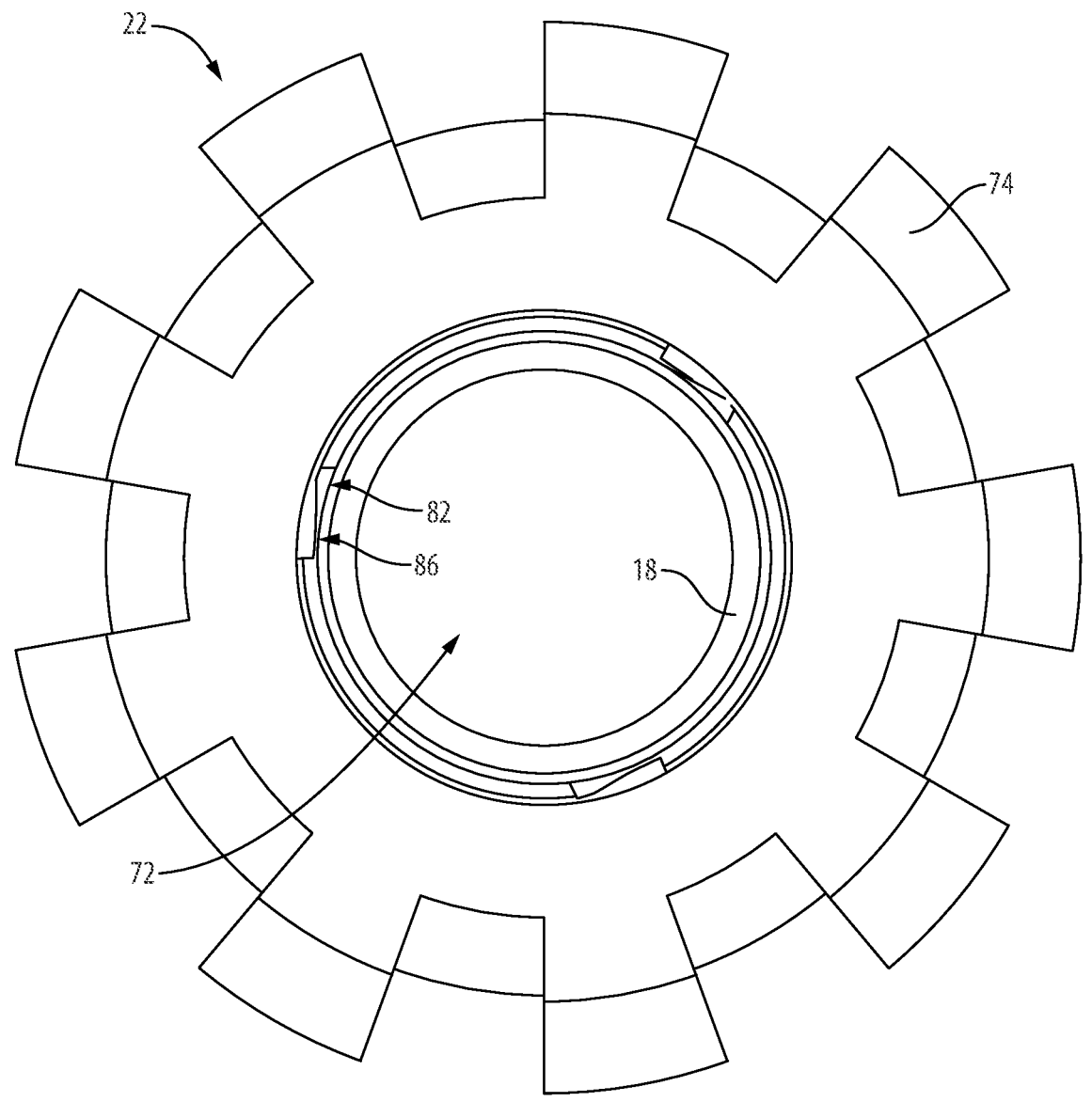
FIG. 7 is an enlarged front view of a retaining member of the saw blade system of FIG. 1.

FIG. 7 illustrates three starts 82 of the mount threads 76 and three starts 86 of the retaining threads 78. FIG. 7 further illustrates the retaining member 22 having nine wings 74. In other embodiments, the retaining member 22 may have fewer or more wings 74.

In some embodiments, the holder 12 and the circular saw blade 10 may be covered in a packaging material while the holder 12 is packaged and on display. The packaging material may be a transparent material (e.g., plastic shrink-wrap) that at least partially surrounds the saw blade 10 and the holder 12.

Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. A saw blade holder for a circular saw blade, the circular saw blade having a central aperture, the saw blade holder comprising:
a base including a window;
a wall provided around the window to border the window, the wall extending from a first side of the base;
a blade mount extending from a second side of the base opposite the first side, the blade mount including threads, the blade mount configured to be received in the central aperture of the circular saw blade; and
a retaining member including threads, the retaining member removably coupled to the blade mount for retaining the circular saw blade on the blade mount.

2. The saw blade holder of claim 1, wherein the threads on the blade mount and the threads on the retaining member include triple start threads.

3. The saw blade holder of claim 1, wherein the threads on the blade mount and the threads on the retaining member include multi start threads.

4. The saw blade holder of claim 1, further comprising a lip around an external circumference of the base, the lip axially extending away from the base.

5. The saw blade holder of claim 4, wherein the lip includes a plurality of raised portions and a plurality of recessed portions.

6. The saw blade holder of claim 5, wherein the plurality of recessed portions and the window are configured to provide access to the circular saw blade.

7. The saw blade holder of claim 1, wherein the retaining member includes a plurality of wings, and wherein the retaining member is configured to abut the circular saw blade.

8. A saw blade holder for a circular saw blade, the circular saw blade having a central aperture, the saw blade holder comprising:
a base;

a blade mount extending from the base, the blade mount configured to be received in the central aperture of the circular saw blade; and
a retaining member including a plurality of wings formed in a perimeter of the retaining member, the retaining member removably coupled to the blade mount for retaining the circular saw blade on the blade mount, the plurality of wings configured to abut the circular saw blade to retain the circular saw blade on the blade mount, the retaining member being generally annular and including a first generally planar side and a second generally planar side opposite and parallel to the first generally planar side, the first generally planar side configured to abut the circular saw blade;
wherein the blade mount includes threads, wherein the retaining member includes threads, and wherein the threads of the retaining member are removably coupled to the threads of the blade mount.

9. The saw blade holder of claim 8, wherein the plurality of wings is configured to assist removal of the retaining member from the blade mount.

10. The saw blade holder of claim 8, wherein the threads on the blade mount and the threads on the retaining member include multi start threads.

11. The saw blade holder of claim 8, wherein the plurality of wings defines a planar first side of the retaining member, and wherein the planar first side of the retaining member is configured to abut the circular saw blade to retain the circular saw blade on the blade mount.

12. The saw blade holder of claim 8, wherein the plurality of wings includes three wings, and wherein each wing is configured to abut the circular saw blade to retain the circular saw blade on the blade mount.

13. A saw blade holder for a circular saw blade, the circular saw blade having a central aperture, the saw blade holder comprising:
a base including a lip axially extending a first distance from an outer circumference of the base;
a blade mount axially extending a second distance from the base, the second distance less than the first distance, the blade mount configured to be received in the central aperture of the circular saw blade; and
a retaining member removably coupled to the blade mount for retaining the circular saw blade on the blade mount,
wherein the retaining member is positioned a third distance away from the base when the retaining member abuts the circular saw blade, and wherein the third distance is less than the first distance.

14. The saw blade holder of claim 13, wherein
the circular saw blade is a first of a plurality of circular saw blades,
the plurality of circular saw blades includes a second circular saw blade positioned between the first circular saw blade and the base,
the retaining member is positioned the third distance away from the base when the retaining member abuts the first circular saw blade, and
the third distance is less than the first distance.

15. The saw blade holder of claim 13, wherein the lip includes a plurality of raised portions and a plurality of recessed portions.

16. The saw blade holder of claim 15, wherein
the plurality of raised portions extends the first distance from the outer circumference of the base,
the plurality of recessed portions extends a fourth distance from the outer circumference of the base, the fourth distance is less than the first distance, and the plurality of recessed portions is configured to provide access to the circular saw blade.

17. The saw blade holder of claim 13, wherein the lip is configured to engage a rear side of a second saw blade holder to stack the second saw blade holder on top of the saw blade holder.

18. The saw blade holder of claim 13, further comprising an anti-rotation member extending radially inward from the lip, wherein the anti-rotation member is configured to be received between adjacent teeth of the circular saw blade.

19. The saw blade holder of claim 18, wherein the anti-rotation member extends the first distance from the base.

20. A saw blade holder for a circular saw blade, the circular saw blade having a central aperture, the saw blade holder comprising:

a base;

a blade mount extending from the base, the blade mount configured to be received in the central aperture of the circular saw blade; and a retaining member including a plurality of wings formed in a perimeter of the retaining member, the retaining member removably coupled to the blade mount for retaining the circular saw blade on the blade mount, the plurality of wings configured to abut the circular saw blade to retain the circular saw blade on the blade mount;

wherein the plurality of wings defines a planar first side of the retaining member, wherein the planar first side of the retaining member is configured to abut the circular saw blade to retain the circular saw blade on the blade mount, and wherein the planar first side defines an outermost diameter of the retaining member.

\* \* \* \* \*